Patented Nov. 3, 1953

2,658,057

UNITED STATES PATENT OFFICE 2,658,057

MASS POLYMERIZATION WITH MIXTURE OF 4,4-DIHYDROXY BENZOYL PEROXIDE AND ADIPOYL PEROXIDE

Harold F. Park, East Longmeadow, Mass., assignor to Monsanto Chemical Company, St. Louis, Mo., a corporation of Delaware No Drawing. Application October 24, 1952, Serial No. 316,790

3 Claims. (Cl. 260—92.8)

This invention relates to a process for polymerizing vinyl halides and styrene. More particularly the invention relates to a process for the mass polymerization of styrene and vinyl halides in the presence of a combination catalyst.

One object of this invention is to provide solid moldable polymers of styrene and vinyl halides.

A further object is to provide a process for the mass polymerization of styrene and vinyl halides.

Another object is to provide a new catalyst system for the mass polymerization of styrene and vinyl halides.

These and other objects are attained by polymerizing styrene or vinyl halides in a mass process in the presence of equimolar quantities of 4,4'-dihydroxy benzoyl peroxide and adipoyl peroxide at temperatures of 100–400° C. and pressures ranging from atmospheric to 500 atmospheres.

The following examples are given in illustration and are not intended as limitations on the scope of this invention. Where parts are mentioned they are parts by weight.

Example I

A mixture of 100 parts of pure monomeric styrene and 1.0 part of a mixture of molar equivalent amounts of 4,4'-dihydroxy benzoyl peroxide and adipoyl peroxide was placed in a stainless steel pipe capped at one end. The mixture was boiled for about 15 minutes at atmospheric pressure to remove dissolved oxygen. The mixture was then cooled in a nitrogen atmosphere and the other end of the stainless steel pipe was firmly capped so that both ends of the pipe were sealed. The sealed pipe was then placed in a molten tin bath at a temperature of 370° C. and kept in said bath at a temperature of 370° C. for 5 minutes. The pipe was then removed from the bath, cooled to room temperature and opened. A solid transparent rod of polystyrene was obtained which was thermoplastic and could be easily molded by the convention injection or compression molding processes.

When the process of Example I was repeated, using no catalyst or benzoyl peroxide as a catalyst, the product was a friable weak polymer which could not be molded by the conventional molding methods.

Example II

Monomeric vinyl chloride containing substantially no oxygen was charged to a stainless steel bomb containing a mixture of molar equivalent amounts of 4,4'-dihydroxy benzoyl peroxide and adipoyl peroxide as a polymerization catalyst. 100 parts of vinyl chloride were used for each 0.1 part of catalyst mixture. The bomb was then heated at about 260° C. under a pressure of 500 atmospheres for about 2 hours. Pressure was then released and the reaction product removed. A 80% yield of a solid, tough and resilient vinyl chloride polymer was obtained which could be easily molded and extruded by conventional means such as compression or injection molding or screw extrusion to yield transparent articles.

4,4'-dihydroxy benzoyl peroxide has the following formula:

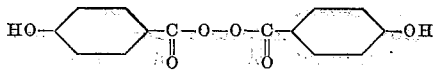

and may be prepared by dissolving p-hydroxy chloride in benzene and stirring this solution into an aqueous solution of sodium peroxide at 0° C. The peroxide is insoluble in both water and benzene and precipitates from the reaction medium as soon as it is formed.

Adipoyl peroxide, which may also be called adipyl peroxide has the following formula:

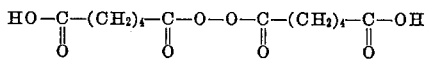

It may be prepared by reacting 1 mol of adipoyl dichloride with 0.5 mol of sodium peroxide in an aqueous medium at about 0° C. No more than 0.5 mol of sodium peroxide may be used since the excess leads to a polymer which is undesirable. The product is an acyl chloride of adipoyl peroxide and is converted to adipoyl peroxide by hydrolysis.

The amount of catalyst mixture used may vary between 0.01 part to 5 parts per 100 parts of monomer. At the lower part of the range, polymerization is slow unless the higher temperature range is used, and the molecular weight of the polymer is relatively high. At from 3 to 5 parts, polymerization is quite rapid even at 100° C. and the product is so low in molecular weight that it approaches the lower limit of moldability. In order to obtain the most accurate control of the reaction rate and to produce an optimum range of moldable polymers, the amount of catalyst is preferably restricted to from 0.1 to 1.0 part per 100 parts of monomer.

The amounts of the components in the catalyst mixture should be equal on a molar equivalent basis since it is essential that the reactive groups of one component are completely condensed with the reactive groups of the second component.

The process of this invention may be carried out at temperatures between 100° C. and 400° C. It is preferable to carry out the invention in the absence of oxygen and other materials which are known to cause polymerization at temperatures below 100° C. The length of the polymerization cycle determines to some extent the molecular weight of the polymer produced. A short cycle at 400° C. can be used to obtain polymers of relatively low molecular weight and a long cycle at 100° C. may be used to produce polymers of considerably higher molecular weight but still moldable in nature.

The process may be carried out at pressures ranging from 1 to 500 atmospheres, depending on the volatility of the monomers and the temperatures used. For vinyl chloride, the pressure should be at least 25 atmospheres.

The process of this invention is applicable to styrene and mixtures of styrene with vinylidene compounds in which mixtures the styrene constitutes the major proportion by weight. Among the compounds which may be polymerized with styrene in the process of this invention are alpha-alkyl styrenes such as alpha methyl styrene; chlorostyrenes such as p-chlorostyrene, 2,5-dichlorostyrene, divinyl benzene, vinyl pyridine, vinyl quinolines; vinyl esters such as vinyl acetate, vinyl butyrate; acrylic and alpha-substituted acrylic acids and the esters, nitriles and amides thereof such as methyl acrylate, ethyl acrylate, acrylonitrile, acrylamide, methyl methacrylate, butyl methacrylate, methyl phenacrylate, methacrylonitrile, methacrylamide, etc.; alpha,beta-ethylenically unsaturated dicarboxylic acids and anhydrides and the esters and amides and nitriles thereof such as maleic acid, maleic anhydride, fumaric acid, fumaronitrile, etc.; dienes such as butadiene, isoprene, piperylene, etc.

In place of the vinyl chloride used in the examples, other vinyl halides or mixtures of vinyl halides with other polymerizable vinylidene compounds may be used. Thus, vinyl fluoride, vinyl bromide or vinyl iodide may be polymerized alone or in conjunction with vinylidene compounds such as vinylidene chloride, vinylidene fluoride, 1,1-chlorofluoroethylene; vinyl esters including vinyl acetate, vinyl butyrate, vinyl laurate, vinyl stearate, etc.; vinyl ethers including vinyl methyl ether, vinyl ethyl ether, vinyl octyl ether, etc.; acrylic acid, acrylonitrile, acrylic esters including methyl, ethyl, propyl, phenyl, etc. acrylates, acrylamide, alpha-substituted acrylic acids, nitriles, esters and amides such as methacrylic acid, methacrylonitrile, ethyl methacrylate, methylacrylamide, methyl methacrylate, atroponitrile, etc.; the acids, esters and amides of alpha, beta-ethylenically unsaturated dicarboxylic acids such as the fumaric, maleic, citraconic, itaconic, etc. acids, their amides and esters, etc. If a copolymer is prepared by the process of this invention, it should contain more than 50% by weight of vinyl halide.

The particular advantage of the process of this invention is the rapidity with which useful polymeric products may be obtained.

This application is a continuation-in-part of my applications Serial No. 128,474 and Serial No. 128,484, both filed November 19, 1949.

It is obvious that variations may be made in the products and processes of this invention without departing from the spirit and scope thereof as defined in the appended claims.

What is claimed is:

1. A mass polymerization process which comprises polymerizing 100 parts of a compound taken from the group consisting of styrene and vinyl halides at from 100 to 400° C. and 1 to 500 atmospheres pressure in contact with from 0.01 to 5.0 parts of an equimolecular mixture of 4,4'-dihydroxy benzoyl peroxide and adipoyl peroxide.

2. A process as in claim 1 wherein the compound is styrene.

3. A process as in claim 1 wherein the compound is vinyl chloride.

HAROLD F. PARK.

No references cited.